United States Patent
Sue (10) Patent No.: US 7,415,363 B2
(45) Date of Patent: *Aug. 19, 2008

(54) HIGH RESOLUTION TORQUE MEASUREMENT ON A ROTATING SHAFT WITH MOVEMENT COMPENSATION

(75) Inventor: Peter Ping-Liang Sue, Greer, SC (US)

(73) Assignee: General Electric Company, Schenectady, NY (US)

( * ) Notice: Subject to any disclaimer, the term of this patent is extended or adjusted under 35 U.S.C. 154(b) by 467 days.

This patent is subject to a terminal disclaimer.

(21) Appl. No.: 11/162,998

(22) Filed: Sep. 30, 2005

(65) Prior Publication Data

US 2007/0078622 A1    Apr. 5, 2007

(51) Int. Cl.
*G01L 3/00* (2006.01)

(52) U.S. Cl. .............................. 702/41; 702/33; 702/42; 702/43; 702/91; 702/56; 702/79; 702/106; 702/145; 702/147; 73/650; 73/660; 73/862.324; 73/862.326; 73/862.328; 324/207.2; 324/220

(58) Field of Classification Search .................. 702/33, 702/41–43, 91, 56, 79, 106, 145, 147, 149; 73/650, 660, 862.324, 862.326, 862.328; 324/207.2, 220
See application file for complete search history.

(56) References Cited

U.S. PATENT DOCUMENTS

| 4,186,597 | A | * | 2/1980 | Brown | 73/862.328 |
| 4,444,064 | A | * | 4/1984 | Wolfinger | 73/862.326 |
| 6,795,779 | B2 | * | 9/2004 | Delvaux et al. | 702/41 |

* cited by examiner

*Primary Examiner*—Tung S. Lau
*Assistant Examiner*—Sujoy K Kundu
(74) *Attorney, Agent, or Firm*—Sutherland Asbill & Brennan LLP (57) ABSTRACT

An apparatus for determining the torque imposed on a rotatable shaft. The shaft has at least four paired probes, paired horizontal probes and paired vertical probes. The horizontal probes are positioned 90 degrees apart from the vertical probes. If the shaft moves horizontally, the time of arrival detected by the first horizontal probes will be later than a nominal value and the time of arrival for the second horizontal probes will be earlier than a nominal value with the same amount of error. Combining data from the first and second horizontal probes will then automatically cancel out any error from horizontal motion. Similarly, combining data from vertical probes will eliminate the error due to vertical movement. Because any radial movement is a combination of horizontal and vertical movements, the use of the probes removes errors due to movement in any direction.

13 Claims, 7 Drawing Sheets

HIGH RESOLUTION TORQUE MEASUREMENT ON A ROTATING SHAFT WITH MOVEMENT COMPENSATION

FIELD OF THE INVENTION

The present invention relates to an improved apparatus and method for measuring torque on a rotating shaft and particularly to an apparatus and method for measuring torque on a rotating load coupling shaft for driving a power generator.

BACKGROUND OF THE INVENTION

Various machines, such as a gas turbine and/or a steam turbine, may be used to drive a load such as a power generator. In particular, a gas turbine and/or a steam turbine may be used to rotate a magnet within a stator to generate electric power. The power generator includes a shaft which is connected to the rotating magnet and which itself is connected to a large connecting shaft (also called a load coupling shaft) rotated by one or more turbines. The connecting shaft is typically large and stiff, thereby resulting in very small torsional displacements (strains) when a torque is imposed on the connecting shaft. A measurement of torque transmitted through the connecting shaft is often made to determine the power output of the machine(s) rotating the connecting shaft.

The torque imposed on the connecting shaft has been measured in the past using strain gauges. However, the accuracy of torque measurements provided by strain gauges often does not meet engineering requirements because the uncertainty of such measurements is rather large as compared to the strains measured.

A known digital light probe system, developed by GE Aircraft Engines, has been used for several applications in the past including measuring compressor rotating blade vibratory displacements.

An existing high resolution torque measurement method employs a pair of high-powered laser probes, one probe at each end of the measured shaft. The probes are perpendicular to the shaft and their tips are positioned at roughly 0.050" from the outer surface of the shaft. A pair of targets, one at each end, are placed between the probes and the shaft at corresponding locations and bonded to the surface of the shaft. As the targets pass by the probes in every revolution when the shaft is rotating, the timing measurement system records all the time of arrival data for the two probes. The software within the measurement system then processes the data by comparing the timing difference between the probes at two ends and convert the results into torsional displacement. Once the torsional displacement is known, the torque on the shaft is calculated using an analytical model or formula.

The method described above works when the shaft remains stationary radially during rotation. However, the measured value may include errors produced from shaft movement when the shaft is subject to radial movement at either end and the torque value is subject to misinterpretation. Accordingly, there remains a need in the art for an improved apparatus and method to measure torque on a rotating shaft, such as a rotating load coupling shaft for driving a power generator, with a high degree of accuracy using multiple probes to remove errors produced from shaft movement so that the measured value represents the true torsional displacement of the shaft.

BRIEF DESCRIPTION OF THE INVENTION

The present invention provides an improved apparatus and method for its use for measuring the torque on a rotatable shaft with an accuracy within +/−0.5%.

In an exemplary embodiment of an improved apparatus and method according to the present invention, two sets of at least four probes are used at each end of a rotatable shaft to compensate for motion induced errors. Paired first and second horizontal probes are positioned 180 degrees apart and paired first and second vertical probes are also positioned 180 degrees apart, in parallel planes perpendicular to the long axis of the shaft. In addition, the paired first and second horizontal probes are positioned 90 degrees apart from the paired first and second vertical probes. If the shaft moves horizontally, the time of arrival for the first horizontal probe will be later than nominal value and the time of arrive for the second horizontal probe will be earlier than nominal value with the same amount of error. Combining the first and second horizontal probes will then automatically cancel out any error from horizontal motion. Similarly, combining first and second vertical probes will eliminate the error due to vertical movement. Since any radial movement is a combination of horizontal and vertical movements, the use of two sets of four or more probes according to the present invention removes errors due to radial movement of the shaft in any direction.

In another exemplary embodiment according to the present invention, an apparatus is provided that incorporates a rotatable shaft; at least one first target coupled on the rotatable shaft so as to rotate therewith; at least one second target coupled on the rotatable shaft so as to rotate therewith, an axial location of the first target along the rotatable shaft being different than an axial location of the second target along the rotatable shaft; at least one first horizontal first probe for transmitting a first horizontal first transmission signal to the first target and receiving a first horizontal first response signal from the first target; at least one first horizontal second probe for transmitting a first horizontal second transmission signal to the first target and receiving a first horizontal second response signal from the first target; at least one second horizontal first probe for transmitting a second horizontal first transmission signal to the second target and receiving a second horizontal first response signal from the second target; at least one second horizontal second probe for transmitting a second horizontal second transmission signal to the second target and receiving a second horizontal second response signal from the second target; at least one first vertical first probe for transmitting a first vertical first transmission signal to the first target and receiving a first vertical first response signal from the first target; at least one first vertical second probe for transmitting a first vertical second transmission signal to the first target and receiving a first vertical second response signal from the first target; at least one second vertical first probe for transmitting a second vertical first transmission signal to the second target and receiving a second vertical first response signal from the second target; at least one second vertical second probe for transmitting a second vertical second transmission signal to the second target and receiving a second vertical second response signal from the second target; an axial location of the first horizontal and vertical first and second probes along the rotatable shaft being different than an axial location of the second horizontal and vertical first and second probes along the rotatable shaft; and a processor operatively coupled to each of the first and second horizontal and vertical first and second probes for determining a torsional displacement of the shaft based at least on the first and second horizontal and vertical first and second response signals received by the first and second horizontal and vertical first and second probes, respectively.

In an alternate embodiment according to the present invention, an apparatus is provided that incorporates a rotatable shaft with a long axis; at least one first target coupled on the rotatable shaft so as to rotate therewith; at least one second target coupled on the rotatable shaft so as to rotate therewith at a location axially displaced from the first target; a first horizontal first probe for transmitting a first horizontal first transmission signal to the first target and receiving a first horizontal first response signal from the first target; at least one first horizontal second probe for transmitting a first horizontal second transmission signal to the first target and receiving a first horizontal second response signal from the first target; at least one second horizontal first probe for transmitting a second horizontal first transmission signal to the second target and receiving a second horizontal first response signal from the second target; at least one second horizontal second probe for transmitting a second horizontal second transmission signal to the second target and receiving a second horizontal second response signal from the second target; a first vertical first probe for transmitting a first vertical first transmission signal to the first target and receiving a first vertical first response signal from the first target; at least one first vertical second probe for transmitting a first vertical second transmission signal to the first target and receiving a first vertical second response signal from the first target; at least one second vertical first probe for transmitting a second vertical first transmission signal to the second target and receiving a second vertical first response signal from the second target; at least one second vertical second probe for transmitting a second vertical second transmission signal to the second target and receiving a second vertical second response signal from the second target; and a processor operatively coupled to each of the first and second vertical and horizontal first and second probes for determining a torsional displacement of the shaft based at least on the first and second vertical and horizontal first and second response signals received by the first and second vertical and horizontal first and second probes, respectively; wherein the first and second targets are coupled to the rotatable shaft on opposite axial ends thereof.

Embodiments according to the present invention further include a method for determining a parameter of a rotatable shaft that includes:

coupling at least one first target on the rotatable shaft so that the first target rotates therewith; coupling at least one second target on the rotatable shaft so that the second target rotates therewith; an axial location of the first target along the rotatable shaft being different than an axial location of the second target along the rotatable shaft; rotating the rotatable shaft; transmitting a first horizontal or first vertical first or second transmission signal to the first target from a first horizontal or first vertical first or second probe, respectively; receiving a first horizontal or first vertical first or second response signal from the first target from a first horizontal or first vertical first or second probe, respectively; transmitting a second horizontal or second vertical first or second transmission signal to the second target from a second horizontal or second vertical first or second probe, respectively; receiving a second horizontal or second vertical first or second response signal from the second target from a second horizontal or second vertical first or second probe, respectively; an axial location of the first horizontal and vertical first and second probes along the rotatable shaft being different than an axial location of the second horizontal and vertical first and second probes along the rotatable shaft; and determining a torsional displacement of the shaft based on at least the first vertical and horizontal first and second response signals and second vertical and horizontal first and second response signals received by the first and second vertical and horizontal first and second probes, respectively.

DETAILED DESCRIPTION OF THE INVENTION

Figure 1:
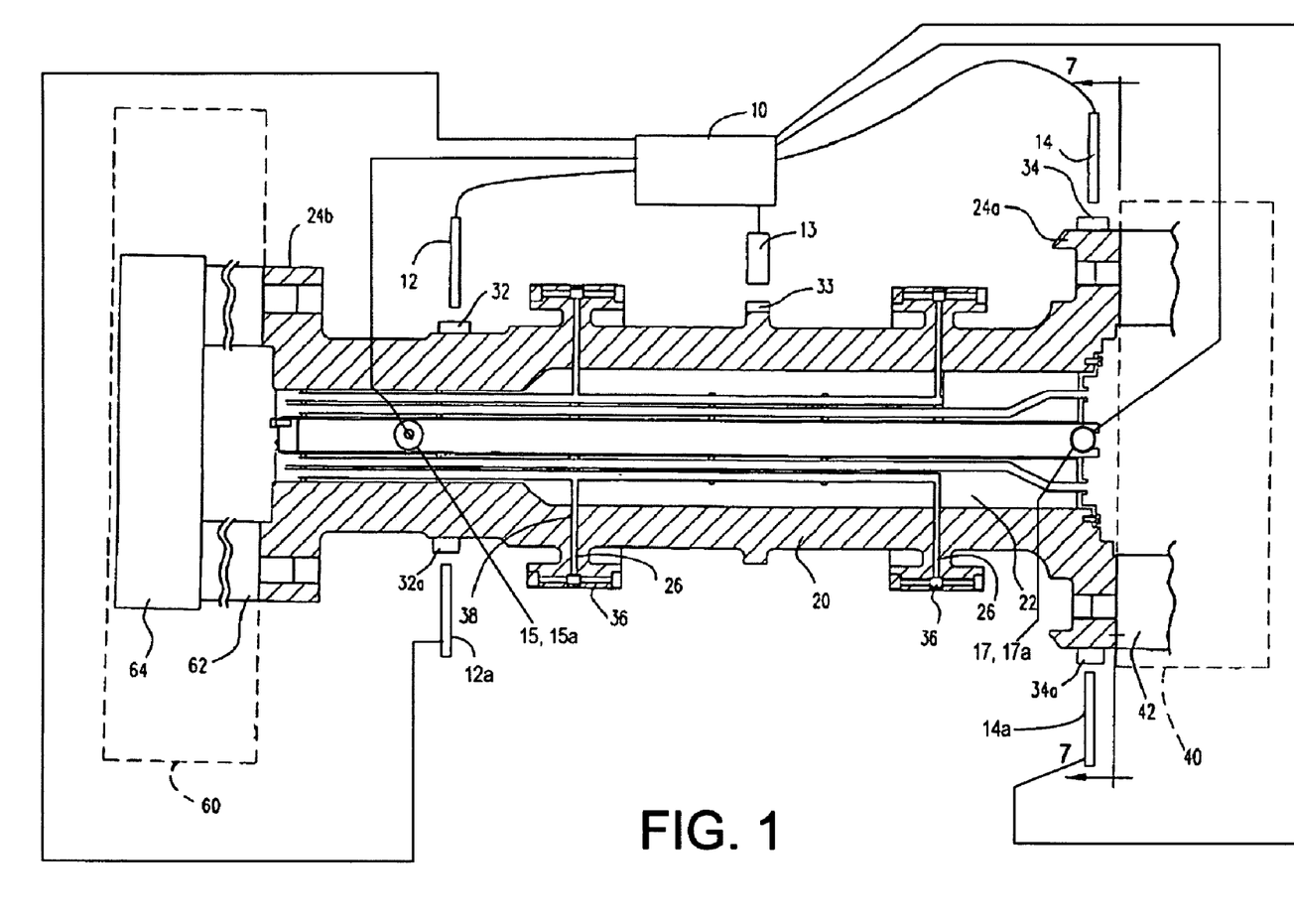
FIG. 1 is a diagram illustrating, inter alia, a cross sectional view of a rotating shaft in a simple cycle configuration whose torque is measured in accordance with an exemplary embodiment of the present invention.

FIG. 1 illustrates a shaft 20 that serves as a load coupling shaft in accordance with an exemplary embodiment of the invention. Shaft 20 is connected at a first axial end 24a to shaft 42 of gas turbine 40 and connected at a second axial end 24b to a rotatable shaft 62 of power generator 60. Accordingly, shaft 20 forms a portion of a simple cycle configuration in the exemplary embodiment illustrated in FIG. 1.

Shaft 20 is rotated by gas turbine machine 40. In turn, the rotational force provided by gas turbine machine 40 is transmitted to rotatable shaft 62 of power generator 60. Rotatable shaft 62 of power generator 60 is connected to a magnet 64 which rotates with rotatable shaft 62 (and hence with shaft 20) within a stator (not shown) of power generator 60 to generate electric power.

Shaft 20 includes a hollow area 22 and one or more passageways 26 leading to hollow area 22. Wires 38 extend through passageways 26 and hollow area 22 to carry signals to and/or from a RF telemetry system 36. RF telemetry system 36 is capable of rotating along with shaft 20 and transmits/receives signals to/from, for example, power generator 60 through wires 38 or wirelessly through a transmitting antenna of the RF telemetry system 36.

A pair of targets 32 and 34 are bonded on an outer surface of shaft 20. Targets 32 and 34 may be mounted on opposite axial ends of shaft 20. For example, in the exemplary embodiment illustrated in FIG. 1, targets 32 and 34 are separated along the axial direction by approximately 80 inches. The respective radii of the outer surface on which targets 32 and 34 are bonded are approximately 11 and 22 inches, respectively. While FIG. 1 illustrates targets 32 and 34 being bonded on the outer surface of shaft 20 at different radii, targets 32 and 34 could alternatively be mounted on an outer surface of shaft 20 at the same radii. Each of targets 32 and 34 may be formed by a pair of highly reflective tapes which are each capable of intensifying and reflecting a light signal which is incident on the tape. Each of the targets 32 and 34 may be aligned at the same circumferential position or be circumferentially offset from one another.

Low power laser light first horizontal first probe 12 and second horizontal first probe 14 are positioned at an angle which is perpendicular to the long axis of shaft 20. First horizontal probe 12 and second horizontal first probe 14 may be made of fiber optic cables for transmitting and receiving laser light signals. In an exemplary embodiment, the tips of first horizontal probe 12 and second horizontal first probe 14 which are closest to shaft 20 are approximately 0.05 inches from the outer surface of shaft 20. First horizontal probe 12 and second horizontal first probe 14 are aligned in the same axial planes as targets 32 and 34, respectively.

In an exemplary embodiment according to the present invention, one or more first horizontal second probes 12a and one or more second horizontal second probes 14a are employed, and positioned in a circular arc around and perpendicular to the long axis of shaft 20 180 degrees from the positions of first horizontal first probe 12 and second horizontal first probe 14, respectively. Similarly, as shown in FIG. 1, first vertical first probe 15 and second vertical first probe 17 are positioned in a circular arc around the shaft 20 at 180 degrees sepration from first vertical second probe 15a and second vertical second probe 17a, respectively. In the exemplary embodiment as shown in FIG. 1, the first horizontal first and second probes 12 and 12a and the second horizontal first and second probes 14 and 14a are positioned with 90 degrees of separation in the same circular axial planes as the first vertical first and second probes 15 and 15a and second vertical first and second probes 17 and 17a, respectively.

Laser light probes 12, 12a, 14, 14a, 15, 15a, 17, and 17a are each connected to processor 10. Processor 10, as will be discussed in more detail below, is capable of calculating a torsional displacement (circumferential twist) of rotating shaft 20 based upon measurements taken by laser light probes 12, 12a, 14, 14a, 15, 15a, 17, and 17a and calculating a torque imposed on shaft 20 based on its torsional displacement. Processor 10, may be implemented by, for example, General Electric Aircraft Engine (GEAE) digital light probe system.

Revolutional target 33 is bonded on an outer surface of shaft 20 and may be formed by a metal. Like targets 32 and 34, revolutional target 33 rotates along with shaft 20. Revolutional target 33 rotates underneath revolutional probe 13 once per revolution of shaft 20. Revolutional probe 13 may be, for example, an eddy current probe which detects the presence of (metal) revolutional target 33. A signal from revolutional probe 13 is triggered and sent to processor 10 once during every revolution of shaft 20 as revolutional target 33 passes underneath and is detected by revolutional probe 13. The trigger signal provided from revolutional probe 13 enables processor 10 to establish a reference zero timing for signals received by first laser probes 12 and revolutional probe 13 in every revolution of shaft 20. Accordingly, a time measured from the reference zero time to the time first horizontal first probe 12 and first vertical first probe 15 receive a signal is started when revolutional probe 13 transmits a trigger signal to processor 10 in every revolution. In cooperation with revolutional target 33, revolutional probe 13 thus forms a "one per revolution sensor." The operation of revolutional probe 13 and revolutional target 33 also provide the necessary information to allow processor 10 to calculate the rotational speed of shaft 20. Specifically, the rotational speed of shaft 20 may be determined by:

$$\omega = 2\pi(1/\Delta t),$$

where $\Delta t$ is the difference between two consecutive trigger signals sent from revolutional probe 13).

In operation, gas turbine 40 will rotate shaft 20, which will in turn rotate generator shaft 62 of power generator 60. The rotation of generator shaft 62 enables magnet 64 to rotate within a stator of power generator 60 to generate electric power.

As shaft 20 rotates, first target 32 will once pass underneath laser light probes 12, 12a, 15, and 15a upon every revolution of shaft 20. Similarly, as shaft 20 rotates, second target 34 will once pass underneath laser light probes 14, 14a, 17, and 17a upon every revolution of shaft 20. The laser light signals transmitted by laser light probes 12, 12a, 15, or 15a, and 14, 14a, 17, or 17a will be incident on targets 32 and 34, respectively, as those targets 32 and 34 pass underneath the respective probes as shaft 20 rotates. Targets 32 and 34 will intensify and reflect the transmitted laser light signals incident on targets 32 and 34. The reflected laser light signals, which effectively form response laser light signals (i.e., laser light signals formed in response to the transmitted laser light signals incident on targets 32, and 34) are received by laser light probes 12, 12a, 15, or 15a, and 14, 14a, 17, or 17a which then send corresponding signals to processor 10. Processor 10 determines and records the precise time at which the laser light signal reflected from target 32 is received by probes 12, 12a, 15, or 15a and the precise time at which the laser light signal reflected from target 34 is received at probes 14, 14a, 17, or 17a. The difference between the respective reception times of the reflected laser light signals by probes 12, 12a, 15, or 15a, and 14, 14a, 17, or 17a may then be detected. For example, a difference of time of as small as approximately 10 nanoseconds may be detected.

The first horizontal first probe 12, first horizontal second probe 12a, first vertical first probe 15 and first vertical second probe 15a transmit first transmission first and second signals and receive first horizontal first and second responses to/from the first target 32. The first vertical first probe 15, first vertical second probe 15a, second vertical first probe 17, and second vertical second probe 17a transmit second vertical first and second transmissions and receive second vertical first and second responses to/from the second target 34.

The difference in time between the laser light signal receptions by probes 12, 12a, 14, 14a, 15, 15a, 17, and 17a will change as different levels of torque is applied to rotating shaft 20. After processor 10 has determined the difference in time, processor 10 can then determine an angular torsional displacement of shaft 20. As an example, the torsional displacement measured in radians may be calculated, assuming the circumferential positions of targets 32 and 34 on shaft 20 are the same (i.e., targets 32 and 34 are circumferentially aligned), by multiplying $\Delta t$ times $\omega$, where $\Delta t$ is the time difference between the receptions of laser light signals by probes (12, 12a, 15, and 15a) and probes (14, 14a, 17, and 17a) and $\omega$ is the rotational speed of shaft 20. The rotational speed $\omega$ of shaft 20 may be determined from the operation of revolutional probe 13 and revolutional target 33 as discussed above.

Figure 2A:
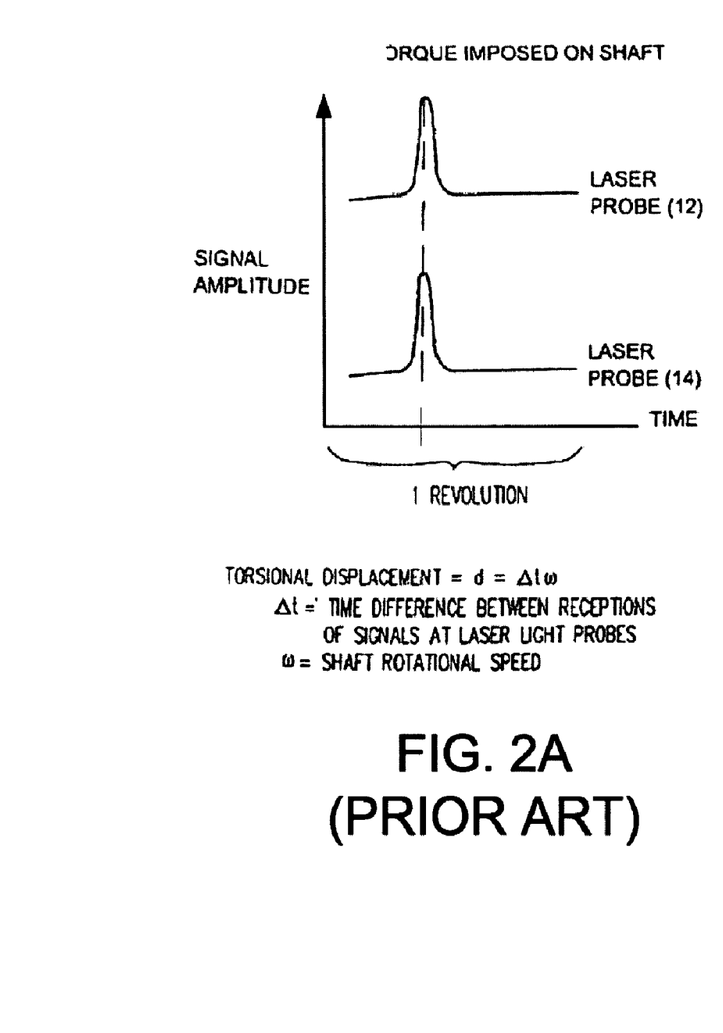
FIG. 2A is a diagram illustrating signals received by at least two different laser light probes from a rotating shaft having no measurable torque imposed thereon.
Figure 2B:
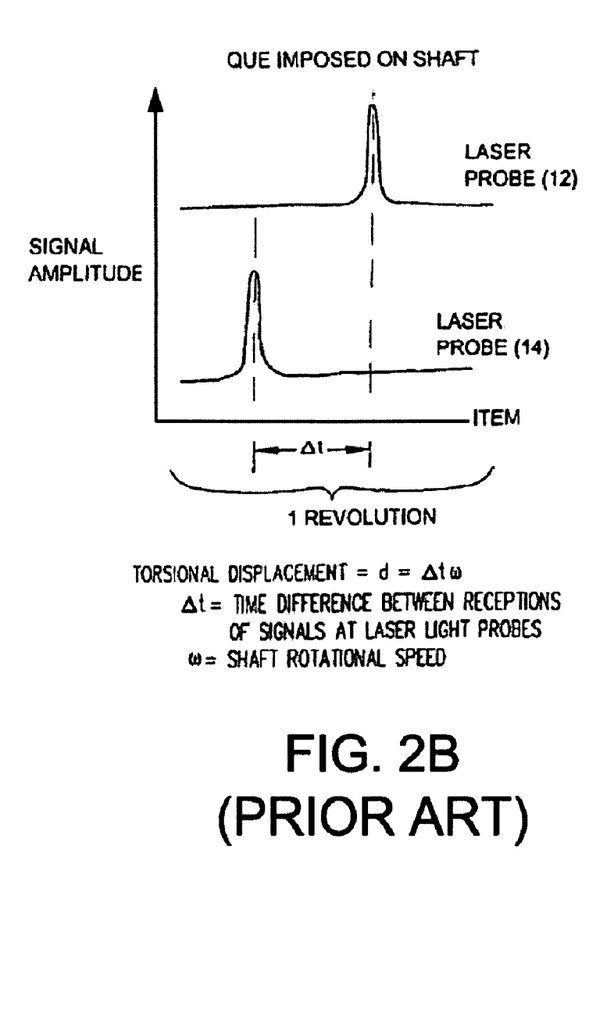
FIG. 2B is a diagram illustrating signals received by at least two different laser light probes from a rotating shaft having a measurable torque imposed thereon.

FIGS. 2A and 2B are diagrams illustrating the reception of laser light response signals received by laser light probes 12, 12a, 14, 14a, 15, 15a, 17, and 17a resulting from laser light signals transmitted from laser light probes 12, 12a, 14, 14a, 15, 15a, 17, and 17a being reflected by targets 32 and 34, respectively, when two different levels of torque are imposed on rotating shaft 20 (again assuming that targets 32 and 34 have the same circumferential position). In particular, FIG. 2A is a diagram which illustrates laser light signals received by laser light probes 12, 12a, 14, 14a, 15, 15a, 17, and 17a when no (measurable) torque is imposed on rotating shaft 20. As can be seen from FIG. 2A, the times at which the respective laser light signals are received by laser light probes (12, 12a, 15, and 15a) and laser light probes (14, 14a, 17, and 17a) are simultaneous. Accordingly, there is no torsional displacement on shaft 20 (i.e., shaft 20 has not been twisted) as a result of the rotational force imposed on the shaft 20 since Δ t, the time difference between receptions of laser light signals by laser light probes (12, 12a, 15, and 15a) and laser light probes (14, 14a, 17, and 17a) is 0 seconds. Of course, if targets 32 and 34 are bonded to shaft 20 at circumferentially offset positions, a time difference which depends at least on the rotational speed of shaft 20 would be expected when there is no torsional displacement of shaft 20.

In contrast to FIG. 2A, FIG. 2B is a diagram illustrating laser light signals received by laser light probes 12, 12a, 14, 14a, 15, 15a, 17, and 17a when a measurable torque is imposed on shaft 20. In particular, because of the torque imposed on shaft 20, shaft 20 will have a torsional displacement (i.e., circumferential twist). Targets 32 and 34 which were previously circumferentially aligned therefore become circumferentially offset from one another so that the respective laser light signals reflected by targets 32 and 34 are received by laser light probes (12, 12a, 15, and 15a) and laser light probes (14, 14a, 17, and 17a) at different times. This difference in time Δt may be multiplied by the rotational speed of the shaft (ω) to calculate the torsional displacement in radians.

Figure 3A:
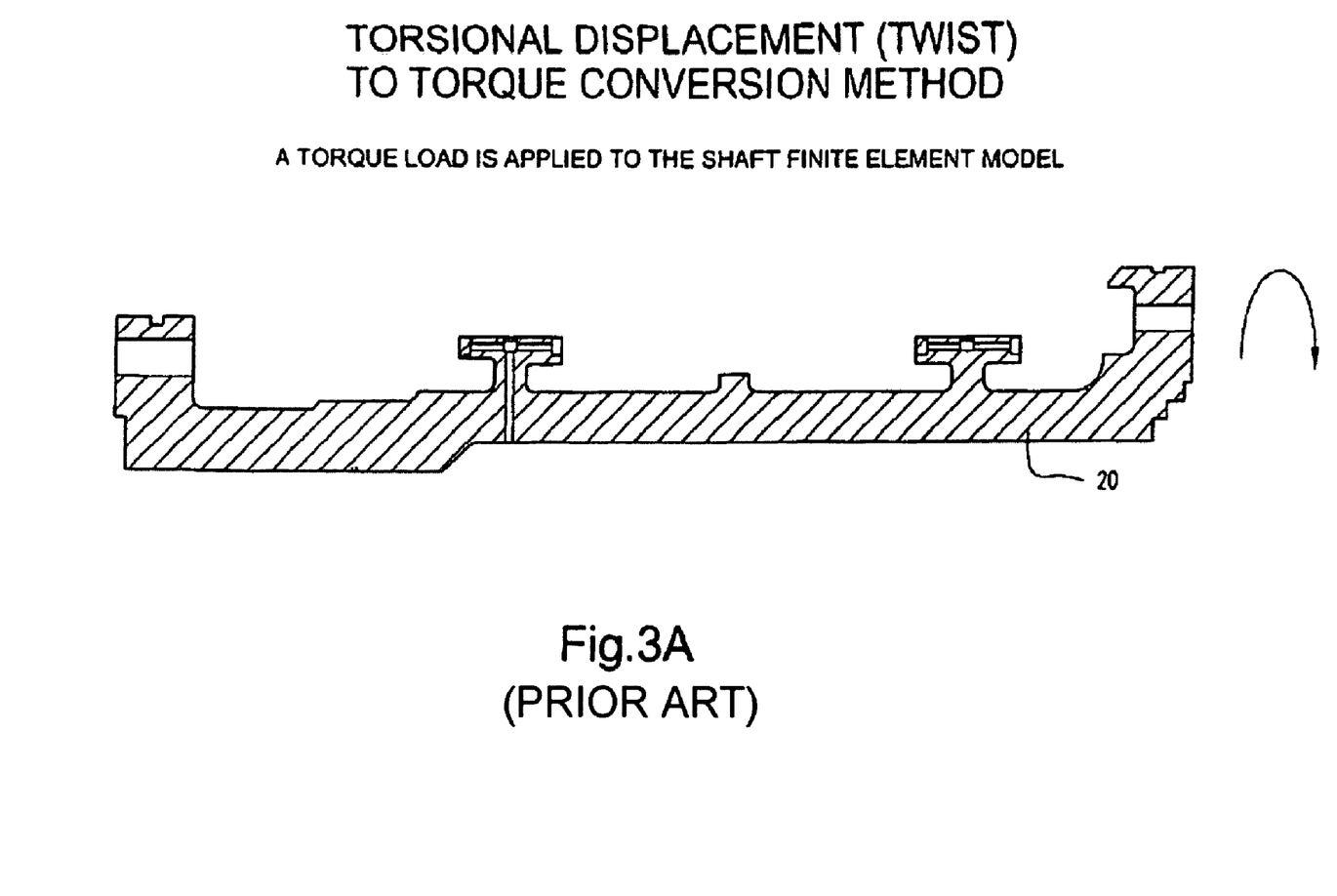
FIGS. 3A-3C are diagrams illustrating an exemplary method for calculating torque of a rotating shaft based on its torsional displacement (circumferential twist).
Figure 3B:
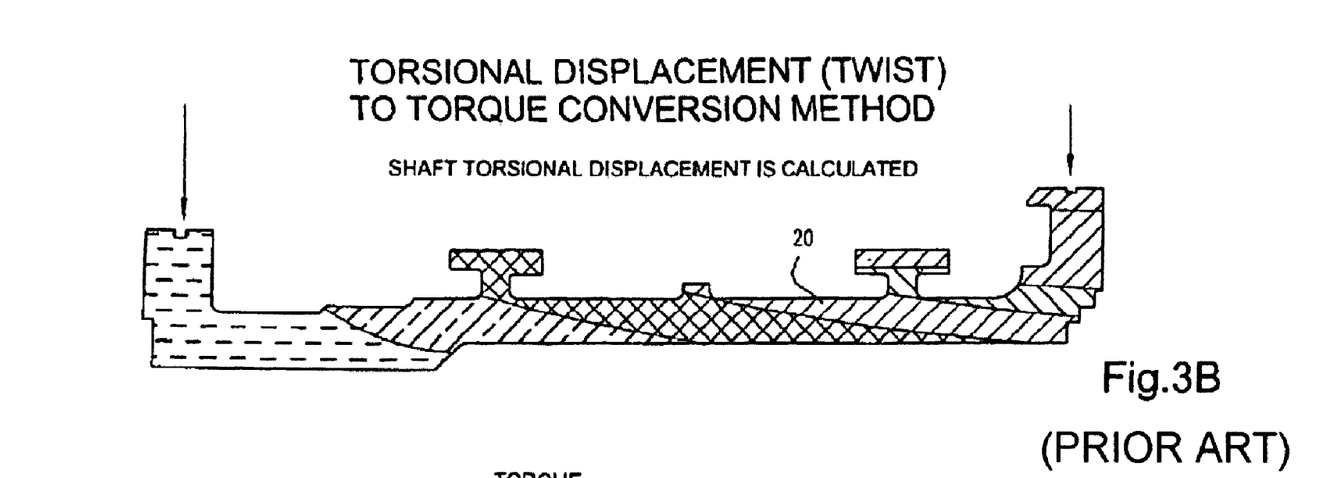
Figure 3C:
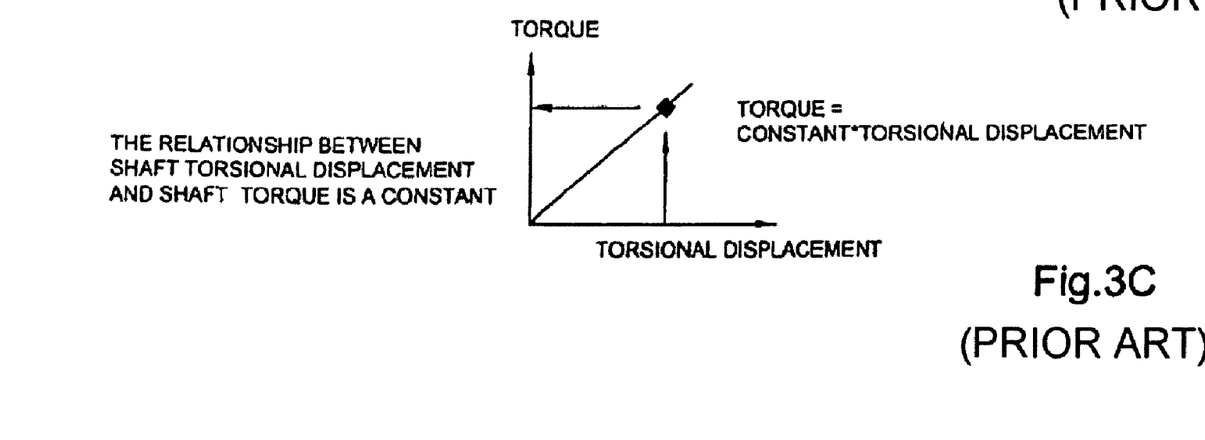

As illustrated generally in FIGS. 3A-3C, processor 10 may then calculate the torque imposed on rotating shaft 20 based on its calculated torsional displacement in a highly accurate manner (e.g., with +0.5%). For example, the torque may be calculated from the torsional displacement using a finite element model analysis. Power generated by gas turbine 40 may be determined based on the calculated torque.

In particular, torque on shaft 20 may be calculated from the torsional displacement as follows. If shaft 20 comprises a uniform material at a constant temperature and its cross-sectional area is uniform and constant over its entire length, then torque may be calculated using the closed form solution:

$$\tau = \frac{(\theta)(G)(j)}{(L)}$$

where τ=torque on shaft, θ=torsional displacement in radians (angle change measured by probes (12, 12a, 15, and 15a) and probes (14, 14a, 17, and 17a) and calculated by processor 10), G=shear modulus of the material of shaft 20 (available in engineering handbooks), j=polar moment of inertia and L=axial distance between probes 12/12a and 14/14a. The polar moment of inertia (j) is the inherent stiffness of shaft 20 and can be calculated by:

$$j = \frac{(\pi)(R^4)}{2}$$

for a solid circular cross section where R=radius of shaft 20.

The torque calculation becomes more complex to precisely determine if any one or more of the following occur:

Shear modulus (G) changes along the length and/or radial direction (e.g., due to temperature changes of the shaft material or use of a different material).

If the cross-sectional area of shaft 20 is not uniform (e.g., keyway notch)

If the cross-sectional area is not constant along the length of shaft 20.

Items (2) and (3) affect the polar moment of inertia (j) calculation. While a combination of shaft design features (items (1) and (3) above) make it virtually impossible to accurately convert torsional displacement to torque using hand calculations (see FIG. 3A), Finite Element Analysis (FEA) can be utilized to accurately to make this calculation with great precision. Specifically, a Finite Element Model (FEM) is created that captures the shaft geometry, material properties, and boundary conditions. A necessary boundary condition is an arbitrary torque load applied parallel to the shaft centerline. The FEA is performed on the FEM and the result is a distribution of torsional displacement along shaft 20 as can be seen in FIG. 3B. The amount of torsional displacement between the axially spaced probes 12/12a and 14/14a is readily available by FEA post processing. This is accomplished by taking the arbitrary torque value used in the FEM and dividing it by the calculated torsional displacement value determined from processor 10. This is the constant that relates torsional displacement to torque as shown in FIG. 3C. Thus, the torque carried by shaft 20 in operation can be calculated by taking the torsional displacement determined by processor 10 and multiplying by the FEA calculated constant.

While shaft 20 illustrated in the exemplary embodiment of FIG. 1 is rotated by a gas turbine 40, those skilled in the art will appreciate that shaft 20 may alternatively be rotated by another machine such as a steam turbine, nuclear power generator or internal combustion engine. Moreover, although shaft 20 transmits the rotational force exerted on it from gas turbine 40 to rotate a magnet 64 in power generator 60, those skilled in the art will appreciate that shaft 20 can be alternatively connected to drive other loads. For example, shaft 20, once rotated by a machine such as turbine 40, can be used to drive other loads such as rotating a propeller on a vehicle.

Figure 4:
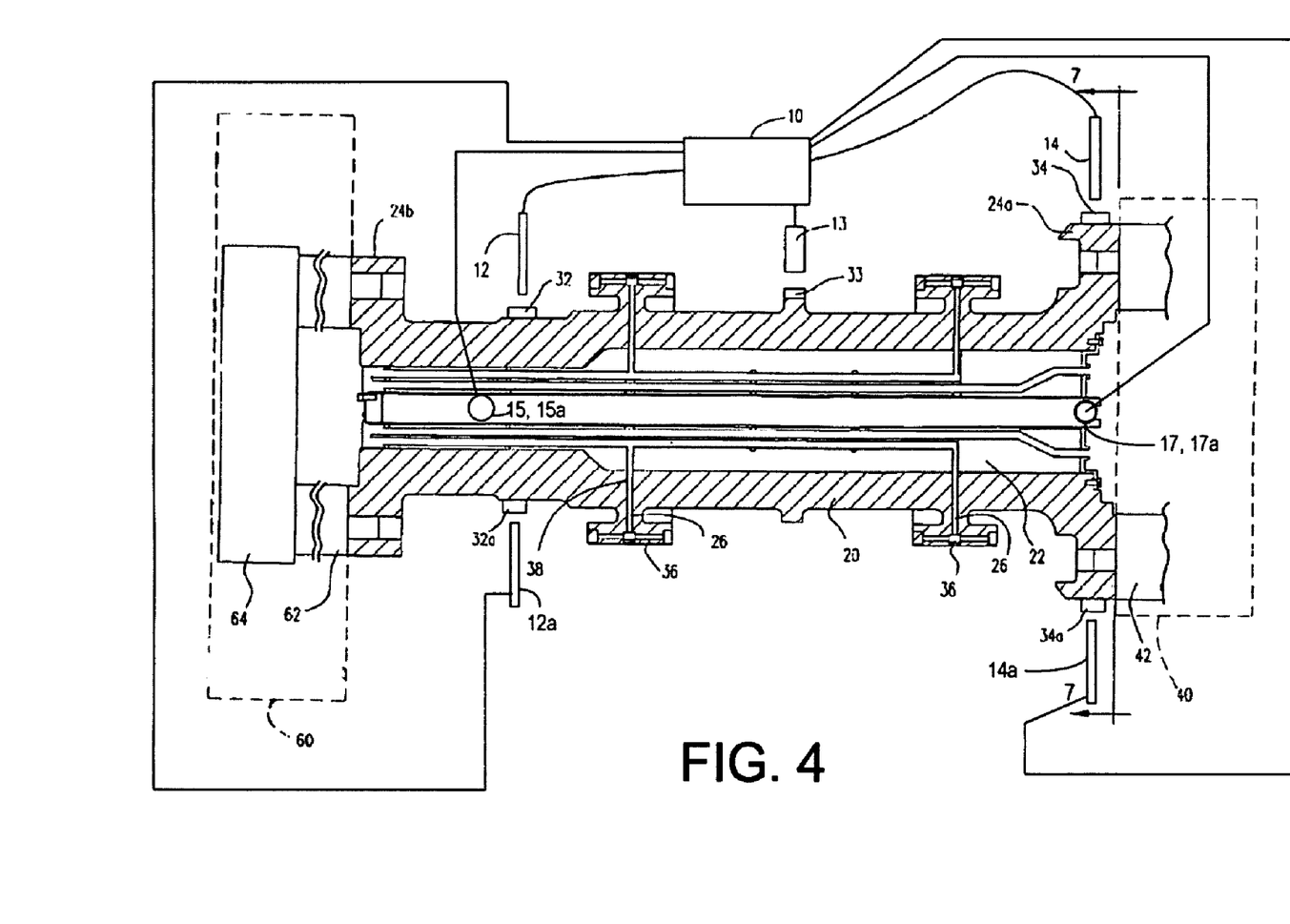
FIG. 4 is a diagram illustrating, inter alia, a cross sectional view of a rotating shaft in a combined cycle configuration whose torque is measured in accordance with an alternative exemplary embodiment of the present invention.
Figure 5:
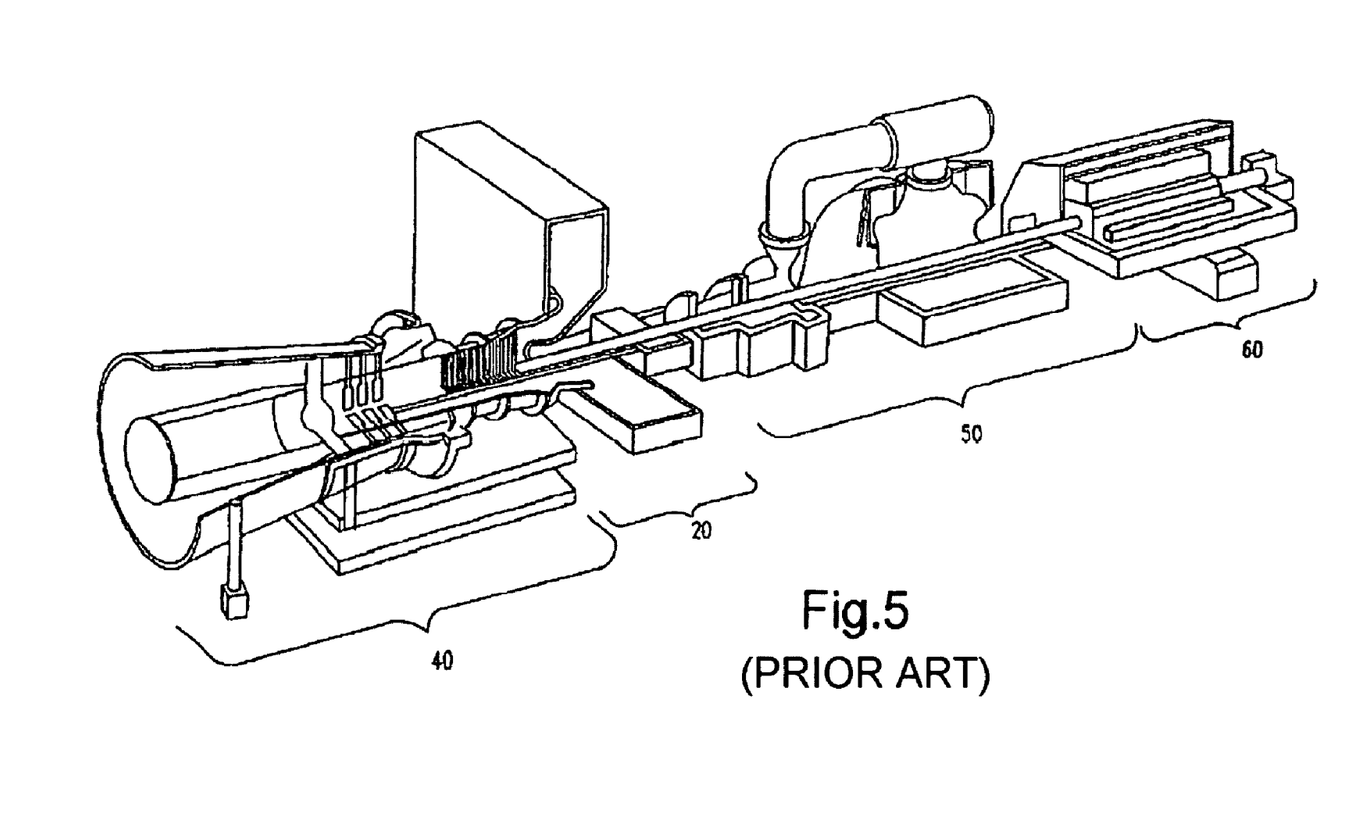
FIG. 5 is a perspective view of the combined cycle configuration illustrated in FIG. 4 (viewed from the reverse side of FIG. 4).

FIGS. 4-5 illustrate another exemplary embodiment of the present invention. Reference numbers corresponding to parts previously described for previous embodiments will remain the same. Only the differences from previous embodiments will be discussed in detail. While FIG. 1 illustrates shaft 20 as part of a simple cycle configuration, FIGS. 4-5 illustrate shaft 20 as part of a combined cycle configuration. Specifically, shaft 20 illustrated in FIGS. 4-5 is rotated by gas turbine 40 while steam turbine 50 imposes a rotational force on generator shaft 62 of power generator 60. Axial end 24a of shaft 20 is connected to turbine shaft 42 of gas turbine 40 and axial end 24b of shaft 20 is connected to steam turbine shaft 52 of steam turbine 50. Gas turbine 40 rotates turbine shaft 42 to rotate shaft 20 and, in turn, shaft 20 rotates steam turbine shaft 52 of steam turbine 50. Thus, the torque imposed on shaft 20 by gas turbine 40 is transmitted to steam turbine shaft 52 which then imposes a torque on generator shaft 62. Generator shaft 62 is thus subject to the combined rotational forces from steam turbine 50 and gas turbine 40. Magnet 64 of power generator 60 thus rotates as a result of rotational forces provided by steam turbine 50 and gas turbine 40.

As discussed in the exemplary embodiment of the FIG. 1, as shaft 20 is rotated by gas turbine 40, laser light signals transmitted from laser light probes 12, 12a, 15, and 15a are reflected by targets 32 and 32a and probes 14, 14a, 17, and 17a are reflected by targets 34 and 34a, respectively, as they revolve and pass underneath probes 12, 12a, 14, 14a, 15, 15a, 17, and 17a. The laser light signals reflected from targets 32, 32a, 34 and 34a are received by laser light probes 12, 12a, 14, 14a, 15, 15a, 17, and 17a and their respective times of arrival measured. Processor 10 then calculates the difference in the time at which laser light signals are received by laser light probes 12, 12a, 14, 14a, 15, 15a, 17, and 17a to determine a torsional displacement and then determines a torque imposed on shaft 20 based upon its torsional displacement. Power generated by gas turbine 40 can be calculated from the determination of torque.

Figure 6A:
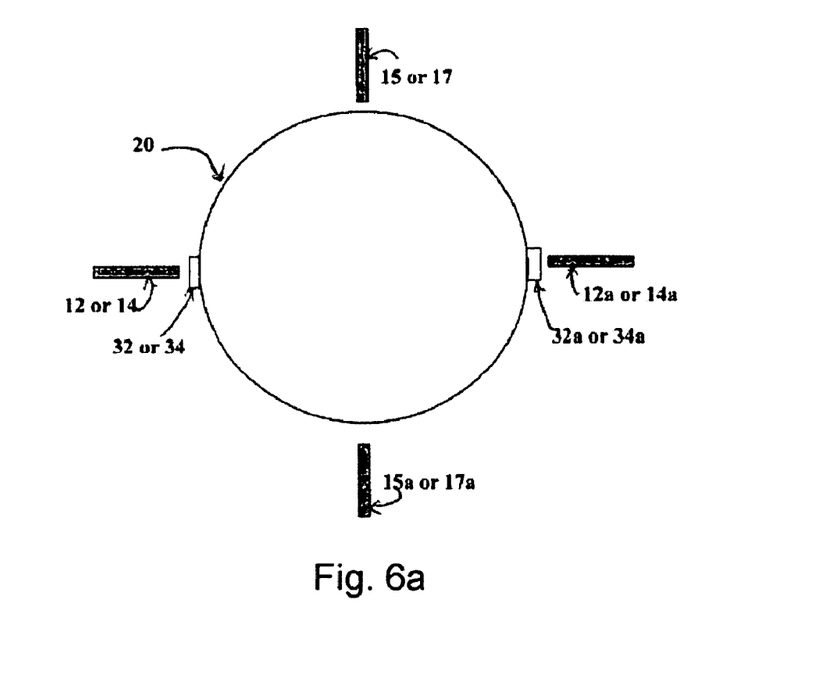
FIG. 6a is a cross sectional view of a rotating shaft according to the present invention taken from line 7-7 in FIG. 1 or 4.
Figure 6B:
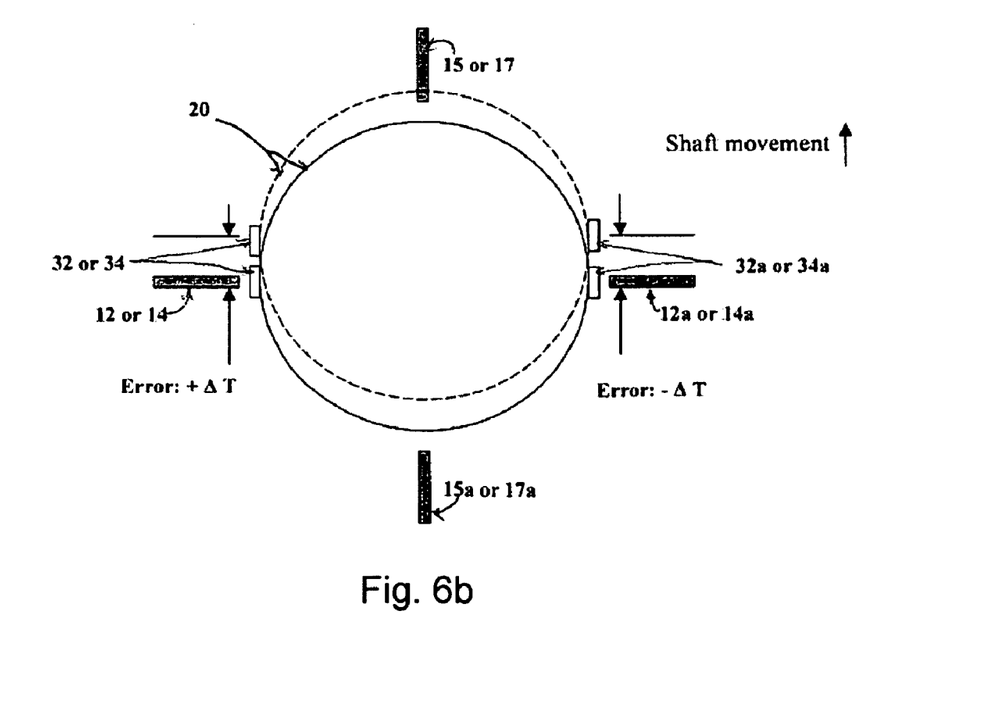
FIG. 6b is a cross sectional view of a rotating shaft according to the present invention, showing target displacement by shaft movement.

FIGS. 6a-b further illustrate an embodiment according to the present invention with multiple targets passing underneath each of light probes 12, 12a, 14, 14a, 15, 15a, 17 and 17a. Specifically, two (or more) targets 32, 32a pass underneath an array of light probes 12, 12a, 15, and 15a, and two (or more) targets 34, 34a pass underneath an array of light probes 14, 14a, 17, and 17a.

As shaft 20 twists when it is loaded, targets 32 and 34 will be displaced from one another as discussed above. These targets 32 and 34 will also be displaced from one another if shaft 20 vibrates. The displacement from shaft vibration can be measured through the use of additional targets 32a and 34a. By assessing the time of arrival of at least one of the sets of targets 32 and 32a (or 34 and 34a) within one revolution of shaft 20 and comparing it to the expected time of arrival based on the actual distance between the targets 32 and 32a and the rotational speed of shaft 20, the displacement from vibration can be calculated. For example, if targets 32 and 32a are circumferentially offset from one another by 180 degrees. (see FIG. 6a), the respective times of arrival of signals detected by probe 12 is expected to be one-half of the time required for one complete rotation. The time for a complete rotation may be determined through the operation of revolutional probe 13 and revolutional target 33 as discussed above. The displacement of shaft 20 due to its vibration may then be determined by the difference between the expected time difference and the actual time difference that respective response signals from targets 32 and 32a are detected by probes 12 and/or 12a and/or the difference between the expected time difference and the actual time difference that respective response signals from targets 34 and 34a are detected by laser light probe 14 and/or 14a. The total torsional displacement may thus be determined by adding the displacement caused by the vibration and the load displacement (i.e., the torsional displacement caused by the rotational force imposed on shaft 20). Accordingly, by bonding additional targets 32a and/or 34a to shaft 20 and detecting response signals therefrom utilizing laser probes 12, 12a, 14, and/or 14a, a correctional value may be determined for the torsional displacement resulting from the rotational force imposed on shaft 20. Accuracy in the torsional displacement measurement may therefore be enhanced.

While FIGS. 6a-b illustrate adding additional targets 32a and 34a onto shaft 20 as part of a simple cycle configuration, those skilled in the art will appreciate that targets 32a and 34a may also be added to a shaft 20 as part of a combined cycle configuration as illustrated in FIGS. 4-5.

The terms "horizontal" and "vertical" are used herein to describe perpendicular planes relative to the long axis of the shaft 20. It is to be understood that any two perpendicular planes relative to the long axis of the shaft 20 may be employed for probe locations in various embodiments according to the present invention, and such probe positions are not limited to any true horizontal or vertical planes relative to any given perspective.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An apparatus with a rotatable shaft having at least one first target coupled on the rotatable shaft so as to rotate therewith and at least one second target coupled on the rotatable shaft so as to rotate therewith, an axial location of the first target along the rotatable shaft being different than an axial location of the second target along the rotatable shaft, comprising:

at least one first horizontal first probe for transmitting a first horizontal first transmission signal to the first target and receiving a first horizontal first response signal from the first target;

at least one first horizontal second probe for transmitting a first horizontal second transmission signal to the first target and receiving a first horizontal second response signal from the first target;

at least one second horizontal first probe for transmitting a second horizontal first transmission signal to the second target and receiving a second horizontal first response signal from the second target;

at least one second horizontal second probe for transmitting a second horizontal second transmission signal to the second target and receiving a second horizontal second response signal from the second target;

a first vertical first probe for transmitting a first vertical first transmission signal to the first target and receiving a first vertical first response signal from the first target;

at least one first vertical second probe for transmitting a first vertical second transmission signal to the first target and receiving a first vertical second response signal from the first target;

at least one second vertical first probe for transmitting a second vertical first transmission signal to the second target and receiving a second vertical first response signal from the second target;

at least one second vertical second probe for transmitting a second vertical second transmission signal to the second target and receiving a second vertical second response signal from the second target;

an axial location of the first horizontal and vertical first and second probes along the rotatable shaft being different than an axial location of the second horizontal and vertical first and second probes along the rotatable shaft; and a processor operatively coupled to each of the first and second horizontal and vertical first and second probes for determining a torsional displacement of the shaft based at least on the first and second horizontal and vertical first and second response signals received by the first and second horizontal and vertical first and second probes, respectively.

2. The apparatus as in claim 1, wherein the processor determines a torque imposed on the rotatable shaft based upon the torsional displacement of the shaft.

3. The apparatus as in claim 1, wherein the processor determines the torsional displacement based on the difference in time between when the first horizontal and vertical first and second response signals are received by the first horizontal or vertical first or second probes and when the second horizontal or vertical first or second response signals are received by the second horizontal or vertical first or second probes.

4. The apparatus as in claim 1, further comprising a power generator which includes a magnet which is coupled to the rotatable shaft to rotate therewith.

5. The apparatus as in claim 1, further comprising at least one of a gas turbine and a steam turbine for rotating the rotatable shaft.

6. The apparatus as in claim 1, wherein the first and second horizontal and vertical probes first and second probes are laser probes and the first and second targets include a reflective material so that the first transmission signal is a laser light signal and the first horizontal and vertical first and second response signals are laser light signals formed from reflection of the first horizontal and vertical first and second transmission signals by the first target, and the second horizontal and vertical first and second transmission signals are laser light signals formed from a reflection of the second horizontal and vertical first and second transmission signals by the second target.

7. An apparatus with a rotatable shaft having at least one first target coupled on the rotatable shaft so as to rotate therewith and at least one second target coupled on the rotatable shaft so as to rotate therewith at a location axially displaced from the first target, comprising:

- at least one first horizontal first probe for transmitting a first horizontal first transmission signal to the first target and receiving a first horizontal first response signal from the first target;
- at least one first horizontal second probe for transmitting a first horizontal second transmission signal to the first target and receiving a first horizontal second response signal from the first target;
- at least one second horizontal first probe for transmitting a second horizontal first transmission signal to the second target and receiving a second horizontal first response signal from the second target;
- at least one second horizontal second probe for transmitting a second horizontal second transmission signal to the second target and receiving a second horizontal second response signal from the second target;
- a first vertical first probe for transmitting a first vertical first transmission signal to the first target and receiving a first vertical first response signal from the first target;
- at least one first vertical second probe for transmitting a first vertical second transmission signal to the first target and receiving a first vertical second response signal from the first target;
- at least one second vertical first probe for transmitting a second vertical first transmission signal to the second target and receiving a second vertical first response signal from the second target;
- at least one second vertical second probe for transmitting a second vertical second transmission signal to the second target and receiving a second vertical second response signal from the second target; and
- a processor operatively coupled to each of the first and second vertical and horizontal first and second probes for determining a torsional displacement of the shaft based at least on the first and second vertical and horizontal first and second response signals received by the first and second vertical and horizontal first and second probes, respectively.

8. A method for determining a parameter of a rotatable shaft, the method comprising: coupling at least one first target on the rotatable shaft so that the first target rotates therewith;

- coupling at least one second target on the rotatable shaft so that the second target rotates therewith;
- an axial location of the first target along the rotatable shaft being different than an axial location of the second target along the rotatable shaft; rotating the rotatable shaft;
- transmitting a first horizontal or first vertical first or second transmission signal to the first target from a first horizontal or first vertical first or second probe, respectively;
- receiving a first horizontal or first vertical first or second response signal from the first target from a first horizontal or first vertical first or second probe, respectively;
- transmitting a second horizontal or second vertical first or second transmission signal to the second target from a second horizontal or second vertical first or second probe, respectively;
- receiving a second horizontal or second vertical first or second response signal from the second target from a second horizontal or second vertical first or second probe, respectively;
- an axial location of the first horizontal and vertical first and second probes along the rotatable shaft being different than an axial location of the second horizontal and vertical first and second probes along the rotatable shaft; and
- determining a torsional displacement of the shaft based on at least the first vertical and horizontal first and second response signals and second vertical and horizontal first and second response signals received by the first and second vertical and horizontal first and second probes, respectively.

9. The method as in claim 8, further comprising determining a torque imposed on the shaft based on the torsional displacement of the shaft.

10. The method as in claim 8, wherein the torsional displacement is determined based on the difference in time between when the first horizontal and vertical first and second response signals are received by the first horizontal and vertical first and second probes and when the second horizontal and vertical first and second response signals are received by the second horizontal and vertical first and second probes.

11. The method as in claim 8, wherein the rotatable shaft rotates a magnet of a power generator.

12. The method as in claim 8, wherein the shaft is rotated by at least one of a gas turbine and a steam turbine.

13. The method as in claim 8, wherein the first and second horizontal and vertical first and second probes are laser probes and the first and second targets include a reflective material so that the first horizontal and vertical first and second transmission signals are laser light signals and the first horizontal and vertical first and second response signals are laser light signals formed from a reflection of the first horizontal and vertical first and second transmission signals by the first target, and the second horizontal and vertical first and second transmission signals are laser light signals and the second horizontal and vertical first and second response signals are laser light signals formed from a reflection of the second horizontal and vertical first and second transmission signals by the second target.

\* \* \* \* \*